United States Patent
Dille

(10) Patent No.: US 9,816,494 B2
(45) Date of Patent: Nov. 14, 2017

(54) FLUID END WITH MODULAR INTAKE MANIFOLD

(71) Applicant: FORUM US, INC., Houston, TX (US)

(72) Inventor: Mark C. Dille, Houston, TX (US)

(73) Assignee: FORUM US, INC., Houston, TX (US)

( * ) Notice: Subject to any disclaimer, the term of this patent is extended or adjusted under 35 U.S.C. 154(b) by 14 days.

(21) Appl. No.: 15/140,772

(22) Filed: Apr. 28, 2016

(65) Prior Publication Data

US 2016/0319805 A1 Nov. 3, 2016

Related U.S. Application Data

(60) Provisional application No. 62/155,558, filed on May 1, 2015.

(51) Int. Cl.
| | |
|---|---|
| F04B 11/00 | (2006.01) |
| F04B 53/16 | (2006.01) |
| F04B 23/06 | (2006.01) |
| F04B 53/00 | (2006.01) |
| F16L 25/14 | (2006.01) |
| F16L 41/03 | (2006.01) |
| F16L 55/033 | (2006.01) |
| F16L 55/04 | (2006.01) |

(52) U.S. Cl.
CPC .......... *F04B 11/00* (2013.01); *F04B 11/0091* (2013.01); *F04B 23/06* (2013.01); *F04B 53/001* (2013.01); *F04B 53/16* (2013.01); *F16L 25/14* (2013.01); *F16L 41/03* (2013.01); *F16L 55/0336* (2013.01); *F16L 55/041* (2013.01); *F05C 2225/00* (2013.01)

(58) Field of Classification Search
USPC ......................................... 417/542
See application file for complete search history.

(56) References Cited

U.S. PATENT DOCUMENTS

| | | | | | |
|---|---|---|---|---|---|
| 3,238,604 | A | * | 3/1966 | Reinarz | F04B 53/00 |
| | | | | | 29/888.02 |
| 3,801,234 | A | * | 4/1974 | Love | F04B 53/00 |
| | | | | | 137/515.5 |
| 3,900,276 | A | * | 8/1975 | Dilworth | F04B 11/0033 |
| | | | | | 417/542 |
| 4,177,016 | A | * | 12/1979 | Aude | F04B 15/02 |
| | | | | | 417/430 |
| 4,388,050 | A | * | 6/1983 | Schuller | F04B 53/007 |
| | | | | | 137/884 |

(Continued)

FOREIGN PATENT DOCUMENTS

DE 1453611 A1 2/1969

OTHER PUBLICATIONS

International Search Report and Written Opinion for Application No. PCT/US2016/029802 dated Jul. 15, 2016.

*Primary Examiner* — John Fox
(74) *Attorney, Agent, or Firm* — Patterson & Sheridan, L.L.P.

(57) ABSTRACT

Embodiments of the disclosure provide a fluid end with a modular intake manifold for use in a pressurized fluid delivery system having two or more modules. According to one embodiment, an intake manifold for a modular multiplex pump includes a reducer coupled to an intake end of each module of the pump, a tee body coupled to a reduced diameter end of each of the reducers, and a damping material disposed within a volume of the reducer.

20 Claims, 5 Drawing Sheets

(56) References Cited

U.S. PATENT DOCUMENTS

| | | | |
|---|---|---|---|
| 4,527,961 A | 7/1985 | Redwine et al. | |
| 5,096,400 A * | 3/1992 | Budecker | F04B 11/0091 417/540 |
| 5,171,136 A * | 12/1992 | Pacht | F04B 53/1025 137/454.4 |
| 7,524,173 B2 * | 4/2009 | Cummins | F04B 15/02 417/338 |
| 8,465,268 B2 * | 6/2013 | Baxter | E21B 43/25 417/437 |
| 8,870,554 B2 * | 10/2014 | Kent | F04B 49/10 137/375 |
| 8,915,722 B1 * | 12/2014 | Blume | F04B 53/007 137/543.23 |
| 2005/0276708 A1 | 12/2005 | Miller | |
| 2014/0130887 A1 | 5/2014 | Byrne et al. | |
| 2015/0038248 A1 | 2/2015 | Deacon | |

\* cited by examiner

US 9,816,494 B2

FLUID END WITH MODULAR INTAKE MANIFOLD

CROSS-REFERENCE TO RELATED APPLICATION

This application claims priority to U.S. Provisional Patent Application Ser. No. 62/155,558, filed May 1, 2015, which is herein incorporated by reference in its entirety.

BACKGROUND

Field

Embodiments disclosed herein relate to a modular intake manifold of a modular fluid end for multiplex plunger pumps, which are used to pump fluids into a wellbore at high volumes and high pressures.

Description of the Related Art

Multiplex plunger pumps are commonly used in the oil and gas industry and are well known in the art. These pumps include a fluid end through which fluid flows, and a power end that reciprocates a plunger within the fluid end to both draw fluid into the fluid end and discharge the fluid out of the fluid end. These pumps can pump fluids into a wellbore at rates of up to 100 barrels per minute and at pressures up to 1,000 pounds per square inch (psi).

The pressure within the fluid end changes rapidly during operation. For example, the pressure within the fluid end can change from a negative pressure when drawing fluid into the fluid end to about 1,000 psi or more when discharging the fluid out of the fluid end. The pressure fluctuation within the fluid end may occur at frequent intervals, such as about every fifth of a second for a pump operating at 300 strokes per minute. Such rapid changes in pressure within the fluid end prevent the fluid from reaching a peak flow velocity when being drawn into the fluid end, which lowers the operating efficiency of the fluid end.

The fluid ends are either monoblock or modular constructions. A modular fluid end includes two or more modules that may be clamped or otherwise joined together such that a damaged module can be replaced without having to remove or replace the entire fluid end. Fluid enters each module from an intake manifold and is discharged from each module into a discharge manifold. Conventional intake manifolds, however, are typically welded to each fluid end module, which makes disassembly and replacement of any one module more time consuming and costly.

Therefore, there exists a need for new and improved fluid ends that address one or more of the drawbacks of conventional fluid ends described above.

SUMMARY

It is therefore an object of the disclosure to provide a modular intake manifold of a fluid end for a multiplex plunger pump.

According to one embodiment, an intake manifold for a modular multiplex pump having a plurality of modules is provided. The intake manifold includes a reducer having a larger diameter end coupled to an intake end of one module, a tee body coupled to a smaller diameter end the reducer, and a damping material disposed within a housing of the reducer.

According to another embodiment, an intake manifold for a modular multiplex pump having a plurality of modules is provided. The intake manifold includes a reducer coupled to an inlet bore of each module, a tee body coupled to a reduced diameter end of each reducer, and a damping material disposed within a volume of each reducer and defining a volume therein that is concentric with the inlet bore.

According to another embodiment, an intake manifold for a modular multiplex pump having a plurality of modules is provided. The intake manifold includes a reducer coupled to an inlet bore of each module, a tee body coupled to a reduced diameter end of each reducer, and a damping material disposed within a volume of each reducer and defining a volume therein that is concentric with the inlet bore, wherein the volume includes a diameter that is substantially the same as a diameter of the reduced diameter end of the reducer.

BRIEF DESCRIPTION OF THE DRAWINGS

Having generally described the various embodiments of the disclosure, reference will now be made to the accompanying drawings.

To facilitate understanding, identical reference numerals have been used, where possible, to designate identical elements that are common to the figures. It is contemplated that elements disclosed in one embodiment may be beneficially utilized with other embodiments without specific recitation.

DETAILED DESCRIPTION

Embodiments of the disclosure provide a modular intake manifold of a modular fluid end for use in a pressurized fluid delivery system. The modular intake manifold, according to the embodiments disclosed herein, may be retrofitted with at most minor modifications to many existing fluid ends for multiplex plunger pumps.

Figure 1A:
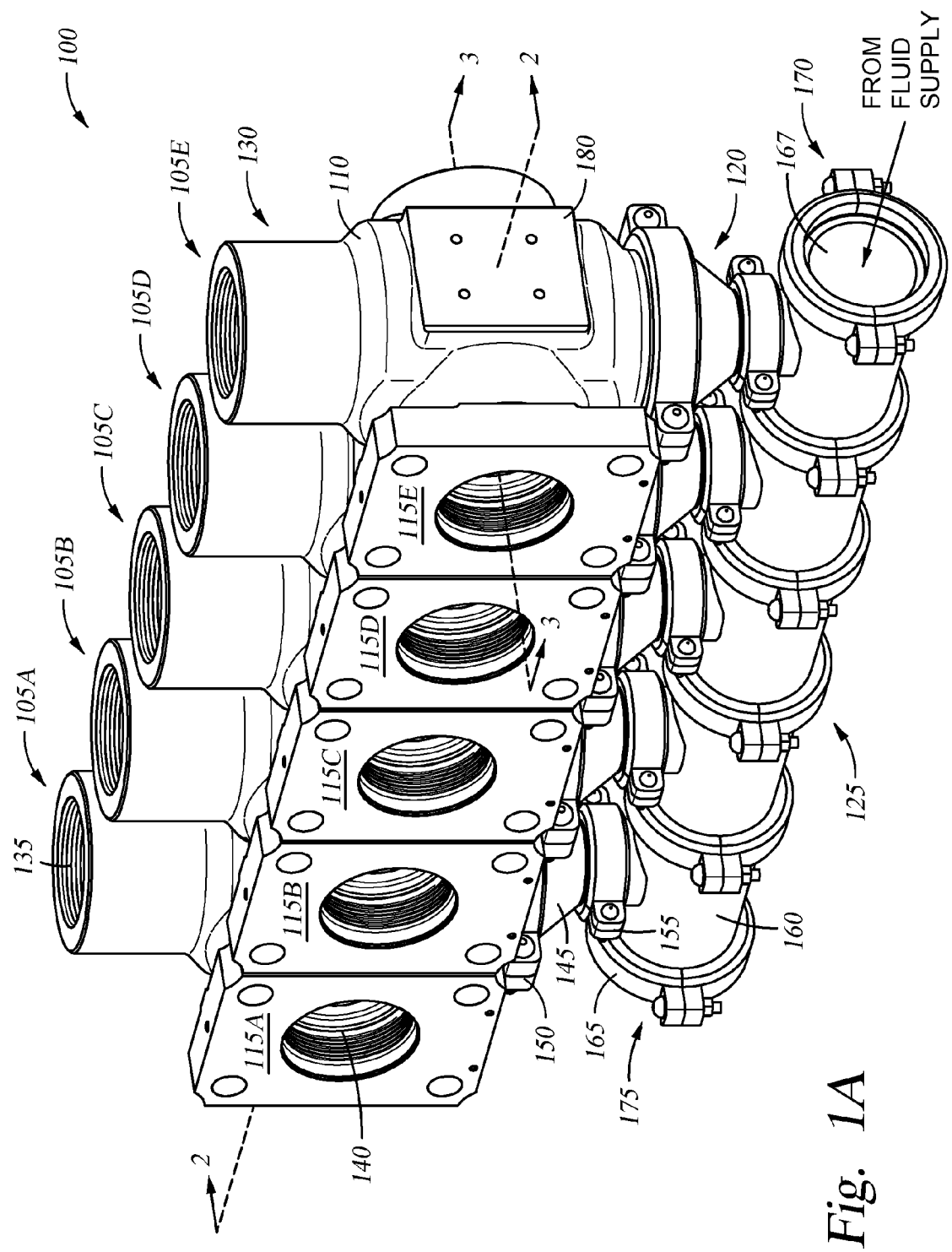
FIG. 1A is a rear perspective view of one embodiment of a fluid end.
Figure 1B:
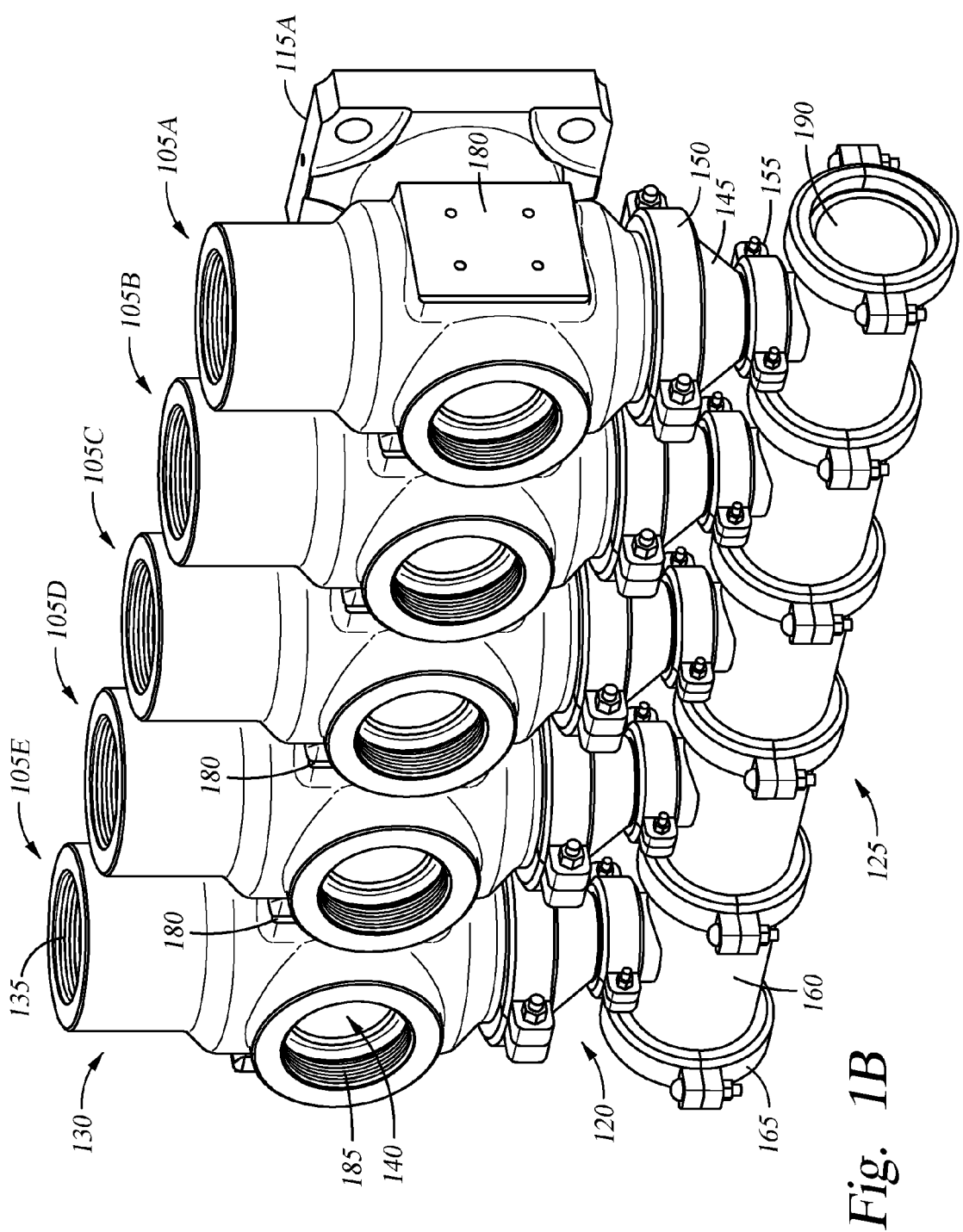
FIG. 1B is a front perspective view of the fluid end of FIG. 1A.

FIG. 1A is a rear perspective view of a fluid end 100, and FIG. 1B is a front perspective view of the fluid end 100 in accordance with one embodiment. In this embodiment the fluid end 100 is for a quint plunger pump having a power end (not shown) that drives five pump plungers (one pump plunger for each fluid end module 105A-105E) in a manner well known in the art. The fluid end modules 105A-105E are substantially identical and interchangeable.

The fluid end 100 includes five fluid end modules 105A-105E, arranged in a side-by-side relationship. Alternatively, the fluid end 100 may include less than five fluid end modules or more than five fluid end modules. The fluid end modules 105A-105E may be clamped or otherwise joined together. Each fluid end module 105A-105E may be forged from a single piece of high tensile strength steel. In one embodiment the steel is AISI 4340 steel that is heat treated to a yield strength (ys) of at least 110 ksi.

Each fluid end module 105A-105E has a cylinder 110 and rear mounting plates 115A-115E that are utilized to mount the respective fluid end modules 105A-105E to a multiplex plunger pump power end (not shown). Each fluid end module 105A-105E further includes an intake end 120 to which an intake manifold 125 is connected. Each fluid end module 105A-105E also includes a discharge end 130 having a threaded discharge bore 135 to which a discharge manifold (not shown) is connected.

An integral coupling plate 180, disposed between adjacent fluid end modules 105A-105E, may be used to couple the adjacent fluid end modules 105A-105E together. The fluid end modules 105A-105E may be clamped together by an external compression clamp (not shown) that is independent of the fluid end modules 105A-105E. Each fluid end module 105A-105E has a plunger bore 140 formed through the cylinder 110 that receives a respective plunger, such as plunger 403 shown in FIG. 4.

The intake manifold 125 is coupled to the intake end 120 of each fluid end module 105A-105E. The intake manifold 125 includes a plurality of tee bodies 160 (e.g. "T" shaped members) coupled to each cylinder 110 of each of the fluid end modules 105A-105E. Connectors 165 may be utilized to couple each of the tee bodies 160 together. A reducer 145 may be coupled between each of the tee bodies 160 and each cylinder 110 of each of the fluid end modules 105A-105E. A larger diameter end of the reducer 145 is coupled to the intake end of one of the modules 105A-105E. A smaller diameter end of the reducer is coupled to one of the tee bodies 160. Connectors 150 and 155 may be utilized to couple the larger diameter end of the reducer 145 to the cylinder 110, and the smaller diameter end of the reducer 145 to the tee body 160, respectively.

Collectively, the plurality of tee bodies 160 form a common inlet chamber 167 of the intake manifold 125. A first end 170 of the inlet chamber 167 may be coupled to a fluid supply that supplies fluid to the fluid end 100. A second end 175 of the inlet chamber 167 may also be coupled to the fluid supply or may include a cap 190 (shown in FIG. 1B) that seals off the second end 175 of the inlet chamber 167. Also shown in FIG. 1B are plunger bore nut threads 185 to which a cover nut (such as cover nut 405 shown in FIG. 4) may be coupled to each of the respective fluid end modules 105A-105E.

Figure 2:
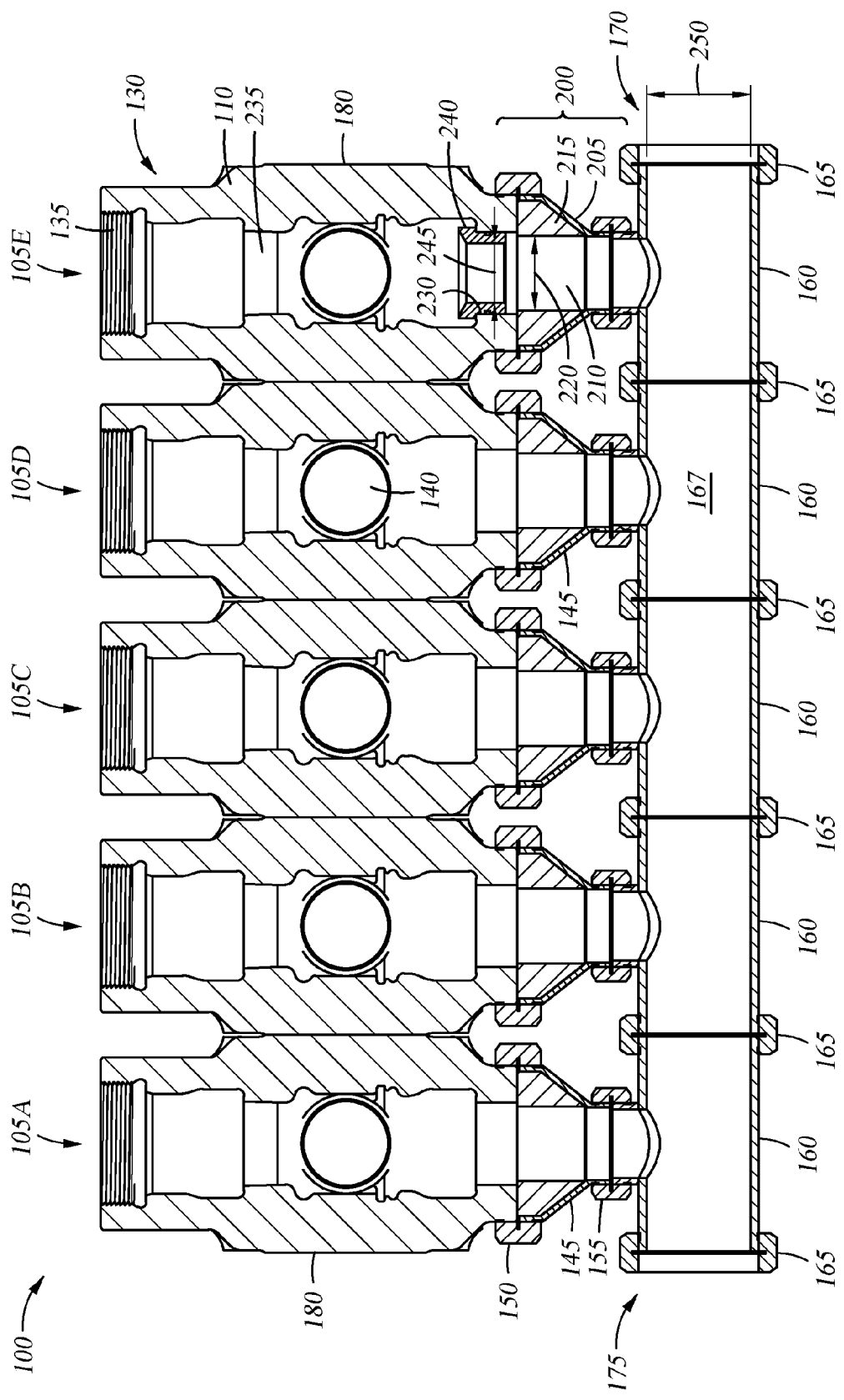
FIG. 2 is a cross-sectional view of the fluid end along lines 2-2 of FIG. 1A.
Figure 3:
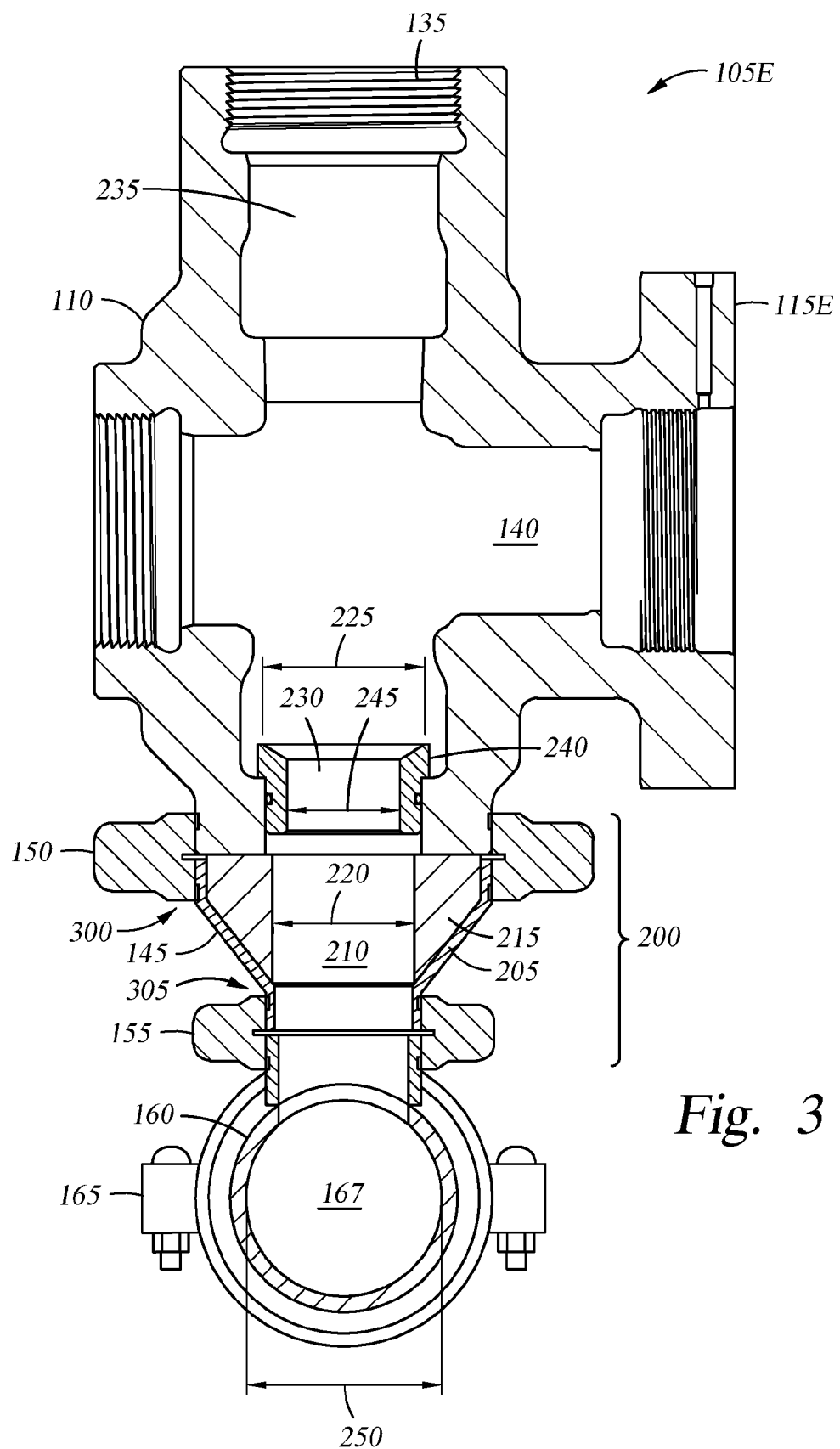
FIG. 3 is a cross-sectional view of the fluid end along lines 3-3 of FIG. 1A.

FIG. 2 is a cross-sectional view of the fluid end 100 along lines 2-2 of FIG. 1A, and FIG. 3 is a cross-sectional view of the fluid end 100 along lines 3-3 of FIG. 1A.

A coupling section 200 of the intake manifold 125 corresponding to fluid end module 105E is shown in FIGS. 2 and 3, although all of the fluid end modules 105A-105D may include the coupling section 200. The coupling section 200 may include the reducer 145 as well as the connectors 150 and 155. The reducer 145 may include a concentric housing 205 that extends between the connectors 150 and 155.

The concentric housing 205 includes a volume 210 that is at least partially filled with a damping material 215. The portion of the volume 210 that is not filled with the damping material 215 (or alternatively stated an inner bore of the damping material 215) includes an inside diameter 220 that may be slightly less than an inside diameter 225 of an inlet bore 230 formed in the cylinder 110. The inlet bore 230 intersects with the plunger bore 140, which intersects with an outlet bore 235 formed in the cylinder 110.

A valve seat 240 may be disposed in the inlet bore 230. An inside diameter 245 of the valve seat 240 may be less than the inside diameter 220 of the volume 210. In one embodiment, the inside diameter 245 of the valve seat 240 is about 3.25 inches and the inside diameter 220 of the volume 210 is about 4 inches. The reducer 145 includes a larger diameter end (first end) 300 and a smaller diameter end (second end) 305. The reducer 145 may be an 8 inch to 4 inch reducer in one embodiment (the first end and the second end, respectively). The connectors 150 and 155, as well as the connectors 165, may be bolt-on clamps or couplings, such as couplings available from the VICTAULIC® Company of Easton, Pa., or other suitable coupling. The connector 150 may be an 8 inch coupling while the connector 155 may be a 4 inch coupling. The inlet chamber 167 may include a diameter 250 that is greater than both of the inside diameter 245 of the valve seat 240 and the inside diameter 220 of the volume 210. In one embodiment, the diameter 250 of the inlet chamber 167 is about 6 inches.

The damping material 215 may be a flexible material such as a polymeric material. As the pressure and/or volume of fluid fluctuates within the cylinder 110 during operation of the fluid end 100, the damping material 215 may be configured to flex (e.g., expand and/or contract) in response to the fluid pressure and/or fluid volume changes. The damping material 215 may be configured to stabilize the velocity of fluid flowing through the cylinder 110, as well as minimize propagation of acceleration induced pressure changes within the cylinder 110 and/or the intake manifold 125. In one embodiment, the damping material 215 comprises a closed-cell foam having discrete gas pockets that are completely surrounded by solid foam material.

Figure 4:
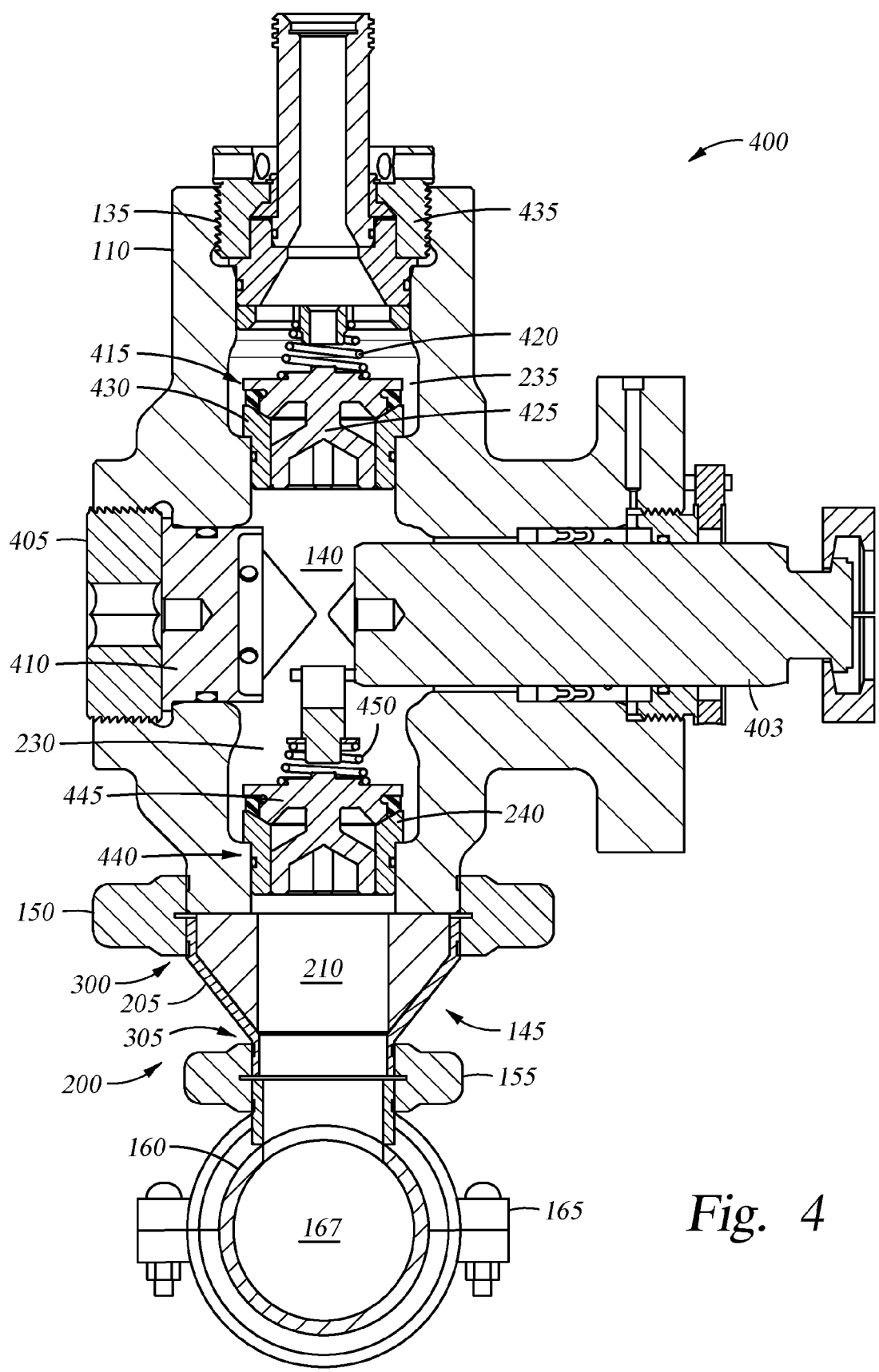
FIG. 4 is a cross-sectional view of a fluid end module showing the internal components thereof.

FIG. 4 is a cross-sectional view of a fluid end module 400 showing the internal components thereof. The fluid end module 400 is similar to any of the fluid end modules 105A-105E described above, the full operation of which will not be repeated herein for brevity. A plunger 403 is shown disposed in one end of the plunger bore 140, and a cover nut 405, as well as a seal gland 410, is disposed in the other end of the plunger bore 140.

At the discharge end of the cylinder 110, a valve assembly 415 having a biasing member, such as a spring 420, is shown disposed in the outlet bore 235. A valve body 425 as well as a valve seat 430 may also be disposed in the outlet bore 235. A quick connect/disconnect collar 435 that attaches to the threaded discharge bore 135 may also be coupled to the cylinder 110. At the intake end of the fluid end module 400, a valve assembly 440 is disposed in the inlet bore 230. The valve assembly 440 includes a valve body 445 biased by a biasing member, such as a spring 450, onto the valve seat 240.

Embodiments of the fluid end 100 having the intake manifold 125 as described herein reduces installation costs and time. The intake manifold 125 as described herein may be easily mounted onto a fluid end without welding, and may be easily disassembled without cutting and/or grinding. Utilization of the connectors 150, 155 and 165 to couple the intake manifold 125 to the fluid end modules 105A-105E provides modularity. Further, the connectors 150, 155, and 165 require no special tooling and may be stronger and cheaper than drilling/tapping holes in the cylinder 110 (for example, in a conventional flange-type mount with nut/bolts). Utilization of the damping material 215 smooths or redistributes pressure within the fluid end 100 which may result in increased operating life of the fluid end 100.

While the foregoing is directed to embodiments of the present disclosure, other and further embodiments of the disclosure thus may be devised without departing from the basic scope thereof, and the scope thereof is determined by the claims that follow.

The invention claimed is:
1. An intake manifold for a modular multiplex pump having a plurality of modules, comprising:
    a reducer having a larger diameter end coupled to an intake end of one module;
    a tee body coupled to a smaller diameter end of the reducer; and a damping material disposed within a housing of the reducer.

2. The intake manifold of claim 1, wherein the reducer comprises a concentric housing.

3. The intake manifold of claim 1, wherein the damping material comprises a polymeric material.

4. The intake manifold of claim 1, wherein the damping material comprises closed-cell foam.

5. The intake manifold of claim 1, wherein each of the tee bodies are coupled together by a bolt-on clamp.

6. The intake manifold of claim 1, wherein each of the reducers are coupled to the module by a bolt-on clamp.

7. An intake manifold for a modular multiplex pump having a plurality of modules, comprising:
   a reducer coupled to an inlet bore of each module;
   a tee body coupled to a reduced diameter end of each reducer; and
   a damping material disposed within a volume of each reducer and defining a volume therein that is concentric with the inlet bore.

8. The intake manifold of claim 7, wherein the volume includes a diameter that is substantially the same as a diameter of the reduced diameter end.

9. The intake manifold of claim 7, wherein each reducer comprises a concentric housing.

10. The intake manifold of claim 7, wherein the damping material comprises a polymeric material.

11. The intake manifold of claim 7, wherein the damping material comprises closed-cell foam.

12. The intake manifold of claim 7, further comprising a valve seat disposed in the inlet bore of each module.

13. The intake manifold of claim 12, wherein an inside diameter of the valve seat is less than a diameter of the reduced diameter end of the reducer.

14. An intake manifold for a modular multiplex pump having a plurality of modules, comprising:
   a reducer coupled to an inlet bore of each module;
   a tee body coupled to a reduced diameter end of each reducer; and
   a damping material disposed within a volume of each reducer and defining a volume therein that is concentric with the inlet bore, wherein the volume includes a diameter that is substantially the same as a diameter of the reduced diameter end of the reducer.

15. The intake manifold of claim 14, wherein each reducer comprises a concentric housing.

16. The intake manifold of claim 14, wherein the damping material comprises a polymeric material.

17. The intake manifold of claim 14, wherein the damping material comprises closed-cell foam.

18. The intake manifold of claim 14, further comprising a valve seat disposed in the inlet bore of each module.

19. The intake manifold of claim 18, wherein an inside diameter of the valve seat is less than a diameter of the reduced diameter end of the reducer.

20. The intake manifold of claim 14, wherein the damping material comprises a conical shape within the reducer.

\* \* \* \* \*